United States Patent

[11] 3,540,773

[72] Inventors Benjamin T. Settle, Jr.;
Sarah E. Settle, 3847 Monica Parkway,
Sarasota, Florida 33580
[21] Appl. No. 720,653
[22] Filed April 11, 1968
[45] Patented Nov. 17, 1970

[54] RETRACTABLE VEHICLE DOOR PROTECTOR
11 Claims, 5 Drawing Figs.
[52] U.S. Cl. ................................................ 296/152, 293/1
[51] Int. Cl. ................................................ B60j 11/00
[50] Field of Search ........................................ 296/152; 293/1, 54D, 62

[56] References Cited
UNITED STATES PATENTS
2,994,356 8/1961 Fleming ........................ 293/54D
1,593,324 7/1926 Anderson ...................... 296/152
1,856,115 5/1932 Sallop ............................ 293/54D
FOREIGN PATENTS
689,935 7/1964 Canada ......................... 293/54D Primary Examiner—Philip Goodman
Attorneys—Clarence A. O'Brien and Harvey B. Jacobson ABSTRACT: A sheet of tough pliant plastic material of requisite length and width is normally wound and stored on a spring-loaded drum or roller. It has a free end which can be caught hold of and pulled out and then drawn tautly over the surface of an automobile door (or doors). This free end has positioning and temporary anchoring and retaining hooks. It also has a pull-out flap or tab. When the sheet spans the door's surface it provides a protective cover while the automobile is parked on a lot, in a service garage or elsewhere. When released, the sheet winds automatically on the out-of-the-way storing roller.

Patented Nov. 17, 1970

3,540,773

Benjamin T. Settle, Jr.
Sarah E. Settle
INVENTORS

BY Clarence A. O'Brien
and Harvey B. Jacobson
Attorneys

RETRACTABLE VEHICLE DOOR PROTECTOR

The present invention relates to certain new and useful improvements in means which is normally stored and out of the way within the confines of a motor vehicle and which, when the vehicle is parked on a parking lot, in a service garage, on the street or elsewhere comes into play to protectively cover vulnerable exterior surfaces of the usual outwardly and forwardly swingable doors.

An object of the invention, generally speaking, is to neatly and effectually cover exterior door surfaces on a parked automobile and, in so doing, to minimize scratching, defacing of the painted surfaces or damaging of the same as so often happens while the vehicle is unoccupied and parked.

Persons conversant with the art to which the invention relates are aware that bumper strips with appropriately cushioned means and other protective devices have been offered with a view toward minimizing door surface damage. In compliance with the principles of the instant concept each door on each side of the car is provided with a plastic or an equivalent strip of sheet material of requisite length and width. To the ends desired, the free end of the strip can be properly pulled out and stretched tautly across the desired door surface and can be anchored in place in a manner to provide the desired protection and to maintain the desired exterior appearance at all times.

In carrying out the principles of the invention the desired result is achieved by providing each door with its ready-to-use protector means. The preferred means is designated, broadly speaking, as an attachment. The ready-to-use attachments are mounted on the interior surfaces in convenient and out-of-the-way places. Each attachment is characterized by an adapter bracket, spring-loaded roller means mounted for rotation on the bracket and enclosed in an appropriate housing, more particularly, a housing which is removably mounted on the bracket and which has slot means by way of which the hook-equipped free end of the sheet material can be withdrawn and spread evenly and tautly over the door surface in the manner herein shown and described.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a vertical sectional view of one of the attachments and wherein the coacting component parts are shown and assembled for use.

And FIG. 5 is an exploded perspective view wherein the individual component parts of the attachment are shown and readied for assembling and use.

Figure 1:
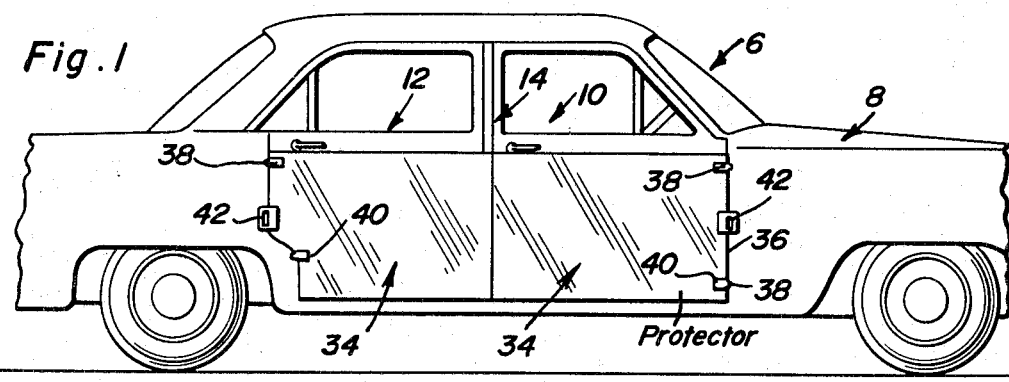
FIG. 1 is a view in side elevation of a motor vehicle herein referred to as an automobile, showing front and rear doors, and how the lower vulnerable surface portions are protectively covered to minimize the likelihood of scratching or defacing.

It will be understood that the invention lends itself to use on two door and four door and various types and makes of automobiles. In FIG. 1 the vehicle or automobile, generally speaking, is denoted by the numeral 6, the forward end being denoted at 8. The front outwardly swinging conventional door is denoted at 10 and the rear door at 12. These doors in the construction and arrangement illustrated in FIG. 2 are located to the front and rear respectively of the door post 14.

Figure 2:
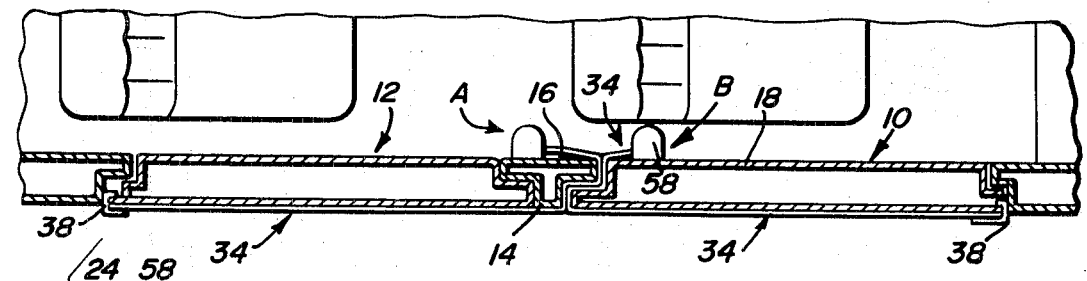
FIG. 2 is a fragmentary horizontal sectional view through the construction illustrated in FIG. 1.

It will simplify the description and understanding of this invention to mention at the outset that the protector means for each door 10 or 12 as the case may be is the same in construction except for a slight arrangement of the ready-to-use interior attachments as shown for example in FIG. 2. With this in mind, one attachment is denoted generally speaking at A, this being for the left-hand or rear door 12. The other attachment is denoted generally at B and this one is for the front door. The attachment A is shown as mounted on the plate portion 16 of the aforementioned door post 14. On the other hand the attachment B is shown mounted on the interior wall portion 18 of the front door.

Figure 4:
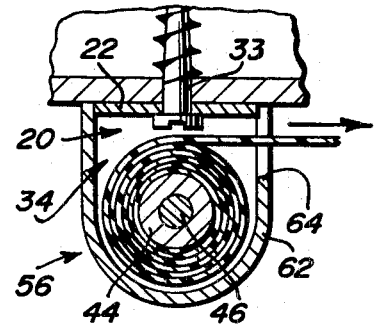
FIG. 4 is an enlarged horizontal section.

The fact that each attachment is structurally the same in construction, a description of a single attachment will suffice. Attention is accordingly directed to FIG. 5 wherein it will be noted that the numeral 20 designates a vertically elongated substantially U-shaped adapter bracket having a vertical bight portion 22 and laterally directed upper and lower end portions 24 and 26. Each end portion is provided with a riblike detent 28 and also with an elongated keeper slot 30. The bight portion is provided with longitudinally spaced keyhole-shaped slots 32 which in practice are removably mounted over the headed ends of the attaching and retaining screws 33 in the manner illustrated in FIG. 4. This bracket means 20 serves to accommodatingly support the sheet material protective cover which is denoted as an entity by the numeral 34. This cover means comprises a strip or sheet of tough plastic material of requisite tensile strength. The material may be transparent or colored depending on the requirements of manufacturers and users. In any event, it will be amply long to serve the protecting and covering purpose illustrated at the left and right in FIGS. 1 and 2. The outward or free edge portion of the sheet material is denoted at 36 and is provided with retaining and anchoring hooks 38 which can be engaged over the cooperating forward marginal edge portion of the door, for example, the door 10. Reinforcing patches 40 may be employed to retain these hooks in place. Also in practice the hooks will be of tough plastic material and amply thin so as not to interfere with the hinging and closing action of the door. The hooks are suitably spaced apart and on the opposite sides of a substantially D-shaped tab 42 which is secured in place and centrally arranged and which is employed to assist the user in withdrawing and extending the protective sheet. The inner end portion of the sheet is suitably riveted or otherwise attached (not detailed) to a coiling and winding roller 44 which is spring-loaded and which serves to automatically rewind the sheet after it has been detached from the position shown, for example, at the right in FIGS. 1 and 2. The manner of spring-biasing the roller may vary. In the construction and arrangement shown the roller is mounted on a shaft 46 and the noncircular end portions 48 of the shaft are removably keyed in the keeper slots 30 in the manner shown in FIG. 3. The roller may be of some other construction and anchored otherwise but is preferably that shown inasmuch as it permits the use of appropriate and suitably tensioned coiled springs 50. The springs surround the end portions of the shaft which project beyond the adjacent ends of the roller. The springs are nested in place between the roller ends and the lateral end portions 24 and 26 of the adapter bracket. One end of the spring is anchored on the shaft as shown at 52 in FIG. 3. The other end of the spring is laterally bent and secured on the end of the roller as shown at 54. Thus this spring-loaded roller serves to automatically rewind the sheet material for compactness and convenience. This is to say, the sheet material is normally stored in an out-of-the-way position on the spring-loaded roller or drum means. It is also desirable to provide a housing or casing such as at 56. This part may be made of suitable plastic material and it is shaped to fit over the bracket and roller and sheet means in the manner illustrated in FIG. 4. The end portions 58 are provided with indentations which constitute detents 60 and which are snapped over the aforementioned ribs 28 to thus detachably mount the housing. One wall 62 (see FIG. 4) of the housing is provided with an entrance and exit slot 64 which permits the user to catch hold of the strip or sheet material and to draw it out over the latch-equipped edge, for example, of the front door. It will be necessary to open the door to permit the strip material to be withdrawn and then stretched tautly over the surface of the door so that the anchoring hooks 38 can be applied and held as perhaps best shown in FIG. 2.

As previously stated and although cover means is provided for the front door 10 and also for the rear door 12, it can simplify an understanding of the overall subject matter to focus attention primarily on a single door and the extensible and retractable cover means which is provided therefor. For this reason it is deemed that a more extended description of the invention is unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:

1. In combination, a motor vehicle body construction including an upstanding side having a door opening therein and a door having a first upstanding marginal edge hingedly mounted on said body adjacent one side of said opening and a second upstanding marginal edge swingable between open and closed positions relative to the opposite side of said opening, exterior surface covering, protecting and preserving means for said door comprising an elongated sheet of flexible material adapted to be manually drawn tautly and flatwise across the surface so that the latter can be temporarily covered and shielded against scratching, marring and damage, a winding member journaled within said body for rotation about an upstanding axis and having one end of said sheet secured thereto for winding thereon and unwinding therefrom, the other end of said sheet including means for releasably anchoring said other end to said vehicle body when said sheet is disposed over the outer surface of said door, and said sheet, when extended from said winding member, passing outwardly through said opening between one of said upstanding door marginal edges and the opposing side of said opening and over the outer surface of said door, said means on the other end of said sheet including means for releasably anchoring the other end of the sheet to the other upstanding marginal edge of said door.

2. The combination defined in and according to claim 1, including an adapter bracket, said winding member being journaled from said adapter bracket, said adapter bracket being detachably hung on headed fasteners carried by an interior surface of said door and situated adjacent the locale of said second upstanding marginal edge.

3. The combination defined in and accordingly to claim 1, including a hollow housing stationarily mounted on an associated portion of said body and which said winding member is disposed, said housing having an elongated slot formed therein through which said sheet material is protractable and retractable.

4. The combination defined in and according to claim 1, and wherein said sheet material is of a length and width that it adequately spans the desired surface horizontally and vertically whereby to protectively cover a sufficient area of the outer surface of the door that it is amply and effectually shielded.

5. The combination defined in and according to claim 1, and wherein said sheet material is made of a suitable grade of plastic material which is possessed of requisite tensile strength, is yieldingly pliable, and amply durable to well serve the express purposes for which it is used.

6. For interior use on a stationary automobile door post or, alternatively, on the interior side of a forward outwardly opening door which is oriented and coordinated with said post, and attachment comprising: a substantially U-shaped adapter bracket having an elongated bight portion having keyhole-shaped mounting slots and laterally inwardly directed upper and lower end portions having noncircular keeper slots, a shaft spaced from and paralleling said bight portion and having terminal ends removably keyed in their respectively cooperable slots, a spooling and winding roller rotatably mounted on said shaft, spring means cooperable with the roller, shaft and laterally directed bracket-ends for tensioning and automatically rewinding said roller, and an elongated sheet of tough but pliant plastic sheet material having one end attached to said roller, said sheet material providing a protective cover for a vulnerable outside surface of said door, said cover being coiled and normally wound on said roller but capable of being unwound by hand, withdrawn, payed out, and then stretched tautly over the intended surface of said door.

7. The attachment defined in and according to claim 6, and wherein the other end of said sheet is free and is provided with end attaching and retaining hooks.

8. The attachment defined in and according to claim 6, and wherein the other end of said sheet is free and is provided with end attaching and retaining hooks, and is also provided with a centrally positioned pull tab.

9. In combination with a motor vehicle body of the type including a longitudinal side with front and rear ends and having a pair of longitudinally spaced front and rear door openings formed therein and separated by an upstanding fixed portion of said body, a pair of upstanding front and rear doors disposed in said openings and including upstanding front and rear edge portions, said doors being hingedly supported along their front upstanding edge portions to the portion of said body defining the forward extremity of said front opening and said fixed portion of said body, respectively, for horizontal swinging of the rear edge portions of said doors toward and away from positions closing said openings, first and second winding members journaled for rotation about upstanding axes from the inner surface of the rear edge portion of said front door and from an inner portion of said upstanding fixed portion of said body, respectively, a pair of front and rear elongated flexible sheets having corresponding base ends and free ends, said base ends of said front and rear sheets being secured to said first and second winding members, respectively, for winding thereon and unwinding therefrom, the free ends of said first and second sheets including means for releasably anchoring to the front and rear edge portions of said front and rear doors, respectively.

10. In combination with a motor vehicle body of the type including a longitudinal side with front and rear ends and having a pair of longitudinally spaced front and rear door openings formed therein and separated by an upstanding fixed portion of said body, a pair of upstanding front and rear doors disposed in said openings and including upstanding front and rear edge portions, said doors being hingedly supported along their front upstanding edge portions to the portion of said body defining the forward extremity of said front opening and said fixed portion of said body, respectively, for horizontal swinging of the rear edge portions of said doors toward and away from positions closing said openings, a winding member journaled for rotation about an upstanding axis from an inner portion of said upstanding fixed portion of said body, an elongated flexible sheet having a base end and a free end, said base end being secured to said winding member for winding thereon and unwinding therefrom, the free end of said sheet including means for releasable anchoring to the rear edge portion of said rear door, and said sheet when extended with its free end secured to the rear edge portion of said rear door passing outwardly from the interior of said body between the rear edge portion of said front door and the opposing forward edge portion of said upstanding fixed portion of said body.

11. In combination with a vehicle body of the type including a door opening therein having front and rear edge portions, a door disposed in said opening and including front and rear edge portions, said door being hingedly supported along one edge portion thereof to the corresponding edge portion of said opening for horizontal swinging of the other edge portion of the door toward and away from the other edge portion of the opening, a winding member journaled from the other edge portion of said door for rotation about an upstanding axis spaced inwardly of the inner surface of said door, an elongated flexible sheet having base and free ends, said base end being secured to said winding member for winding thereon and unwinding therefrom, the free end of said sheet including means for releasable anchoring to said one edge portion of said door, said sheet when extended and having its free edge portion anchored to said one edge portion of said door and extending outward from said body between said other edge portion of said door and said other edge portion of said opening and over the outer surface of said door toward said one edge portion of said door.